(12) United States Patent  (10) Patent No.: US 7,753,025 B2
Sasaki et al.  (45) Date of Patent: Jul. 13, 2010

(54) SURFACE IGNITION MECHANISM FOR DIESEL ENGINES

(75) Inventors: Shizuo Sasaki, San Antonio, TX (US); Gary Dale Neely, Boerne, TX (US)

(73) Assignee: Southwest Research Institute, San Antonio, TX (US)

( * ) Notice: Subject to any disclaimer, the term of this patent is extended or adjusted under 35 U.S.C. 154(b) by 158 days.

(21) Appl. No.: 12/101,562

(22) Filed: Apr. 11, 2008

(65) Prior Publication Data

US 2009/0255499 A1    Oct. 15, 2009

(51) Int. Cl.
 *F02B 9/08* (2006.01)
(52) U.S. Cl. .................... 123/298; 123/305; 123/179.6; 123/145 A
(58) Field of Classification Search ................. 123/298, 123/305, 145 A, 179.6
 See application file for complete search history.

(56) References Cited

U.S. PATENT DOCUMENTS

| | | | | |
|---|---|---|---|---|
| 1,693,966 | A * | 12/1928 | Sperry | 60/622 |
| 1,780,499 | A * | 11/1930 | Novelli | 123/298 |
| 1,956,586 | A * | 5/1934 | Palmer | 123/145 A |
| 2,628,600 | A * | 2/1953 | Malin | 123/298 |
| 4,240,392 | A * | 12/1980 | Matayoshi et al. | 123/145 A |
| 4,577,601 | A * | 3/1986 | Klak | 123/298 |
| 4,627,405 | A * | 12/1986 | Imhof et al. | 123/549 |
| 4,721,081 | A * | 1/1988 | Krauja et al. | 123/298 |
| 4,787,349 | A * | 11/1988 | Hilger | 123/297 |
| 5,329,908 | A * | 7/1994 | Tarr et al. | 123/527 |
| 5,367,996 | A | 11/1994 | Homik et al. | |
| 5,778,844 | A | 7/1998 | Kuttner | |
| 5,862,786 | A | 1/1999 | Fuchs et al. | |
| 6,009,369 | A | 12/1999 | Boisvert et al. | |
| 6,481,428 | B1 | 11/2002 | Makki et al. | |

(Continued)

FOREIGN PATENT DOCUMENTS

EP    0644330    12/1997

(Continued)

OTHER PUBLICATIONS

Ngk Spark, "Glow Plugs," available at http://www.ngksparkplugs.com.au/glowplug_info.php#; retrieved on Nov. 19, 2007.

(Continued)

*Primary Examiner*—Erick Solis
(74) *Attorney, Agent, or Firm*—Grossman Tucker et al

(57) ABSTRACT

The present disclosure relates to combusting fuel during cold start. A glow-plug may be provided within a combustion chamber having a volume including a piston, wherein the glow plug may provide a localized heated region. Air may then be provided into the chamber and compressed. A mass of fuel may also be provided into the combustion chamber, wherein an amount of the fuel mass may be directed towards the localized heated region of the glow plug, wherein the heated region of the glow plug may have a temperature $T_1$, and the equivalence ratio of the fuel in the heated region achieves a value that the temperature $T_1$ provides auto-ignition. All or a portion of the mass of fuel directed towards the heated region of said glow plug may be ignited, and then the remainder of the fuel may be ignited by auto-ignition and/or flame propagation.

23 Claims, 11 Drawing Sheets

U.S. PATENT DOCUMENTS

| | | | |
|---|---|---|---|
| 6,854,438 B2 * | 2/2005 | Hilger et al. | 123/260 |
| 7,258,112 B1 | 8/2007 | Ptak et al. | |
| 7,281,515 B2 * | 10/2007 | Mann et al. | 123/305 |
| 7,527,033 B2 * | 5/2009 | Okada et al. | 123/298 |
| 2005/0092287 A1 | 5/2005 | Tozzi et al. | |
| 2005/0098136 A1 | 5/2005 | Zhu et al. | |
| 2007/0079817 A1 | 4/2007 | VanDyne et al. | |
| 2007/0289572 A1 * | 12/2007 | Petridis et al. | 123/305 |

FOREIGN PATENT DOCUMENTS

| | | |
|---|---|---|
| JP | 57131822 | 8/1982 |
| JP | 02023261 | 1/1990 |
| JP | 11210522 | 8/1999 |
| JP | 200345948 | 12/2000 |
| KR | 1081127 | 8/2001 |
| KR | 3039488 | 5/2003 |

OTHER PUBLICATIONS

Lux, "What is Cackle?" available at http://www.diesel-central.com/News/cackle.htm; retrieved on Nov. 20, 2007.

* cited by examiner

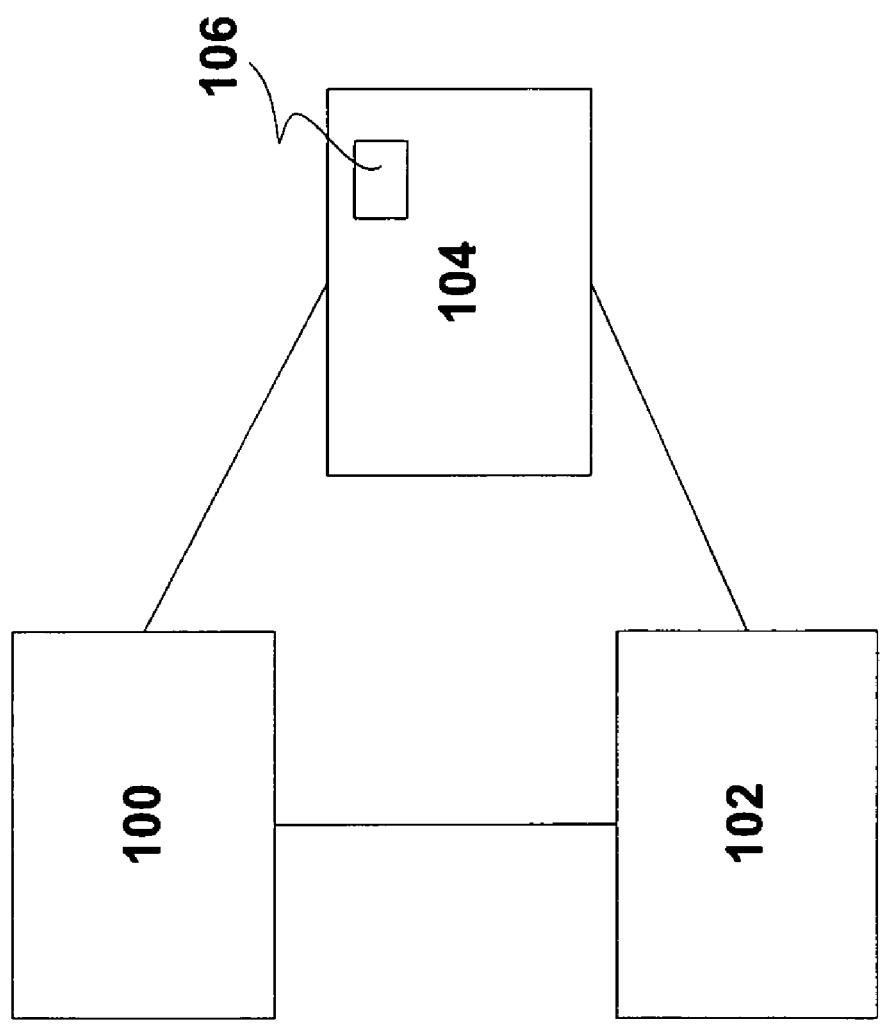

SURFACE IGNITION MECHANISM FOR DIESEL ENGINES

FIELD OF THE INVENTION

The present invention relates generally to a surface ignition mechanism for diesel engines and in particular, a mechanism to facilitate cold start of a diesel engine.

BACKGROUND

Diesel engines rely upon heat generated by the compression of air within a cylinder to ignite fuel. Air may be drawn into a cylinder and may be highly compressed, causing the temperature of the air to increase to a temperature sufficient to cause fuel exposed to the compressed air to ignite. However, in cold weather, the ability of the compressed air to heat to a sufficient temperature to cause ignition of the fuel may be reduced due to the absorption of heat from the compressed air into the engine itself. Mechanisms to raise the air and engine temperature may be employed to facilitate fuel ignition including the use of glow plugs to raise the temperature of the air and cylinder, intake heaters to warm the intake air, or engine block heaters to warm the engine itself.

SUMMARY OF THE INVENTION

An aspect of the present disclosure relates to a method of combusting fuel. The method may include providing a glow-plug within a combustion chamber having a volume including a piston, wherein the glow plug provides a localized heated region. Air may then be provided into the chamber and compressed. A mass of fuel may also be provided into the combustion chamber, and an amount of the mass of fuel may be directed towards a localized heated region of the glow plug. The glow plug region may have a temperature $T_1$, wherein the equivalence ratio of the fuel in the heated region may achieve a value such that $T_1$ provides auto-ignition, and all or a portion of said mass of fuel directed towards said heated region of said glow plug may be ignited. In addition, the remainder of the fuel may be ignited at an auto-ignition temperature.

A further aspect of the present disclosure relates to an engine including a combustion chamber having a volume and including a piston and a cylinder. In addition, the engine may include an air intake port configured to direct air into the combustion chamber and a fuel injector configured to inject a mass of fuel into the combustion chamber. Furthermore, the engine may include a glow plug including a resistive heating element provided in the combustion chamber, configured to provide a localized region of heating, wherein the air intake port and/or the piston are configured to direct an amount of the mass of fuel towards the localized region, wherein the localized region of heating is configured to ignite at least a portion of said fuel.

A further aspect of the present disclosure relates to a system for cold-start of a diesel engine. The system may include an engine control unit and a temperature sensor in communication with the control unit and configured to detect one of: (i) a temperature of an environment surrounding the engine; or (ii) a temperature of engine coolant. In addition, the system may include a combustion chamber having a volume and including a piston and a cylinder, an air intake port configured to direct air into the combustion chamber, a fuel injector configured to inject a mass of fuel into the combustion chamber, and a glow plug including a resistive heating element provided in the combustion chamber. The glow plug may be configured to provide a localized region of heating, wherein the air intake port and/or the piston are configured to direct an amount of the mass of fuel towards the localized region, wherein the localized region of heating is configured to ignite a portion of the fuel. The engine control unit may be configured to activate the glow plug based upon the detected temperature.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein:

FIGS. 8a and 8b are a side view and top view, respectively, of a combustion chamber, wherein fuel is being injected into the combustion chamber and FIGS. 8c and 8d are a side view and top view, respectively, of a combustion chamber, after fuel is injected into the combustion chamber and the piston approaches top dead center.

FIG. 9a illustrates fuel being injected into the combustion chamber prior to reaching top dead center and FIG. 9b illustrates the flow of the fuel towards the glow plug due to squish flow.

FIG. 10 illustrates a diagram of an example of a system for controlling a glow plug.

DETAILED DESCRIPTION

The present disclosure is directed to starting a diesel engine in cooler conditions, otherwise known as cold start. As noted above, diesel engines ignite fuel by exposing the fuel to compressed air during the ignition cycle. During cold start, however, compression of air may be less effective at raising the air temperature to the fuel ignition temperature. Many factors may contribute to this effect, including the absorption of heat from the compressed air into the engine block. Cold start may be understood as starting an engine in a surrounding environment of 10° C. or less and/or when the coolant temperature is less than 60° C.

Figure 1:
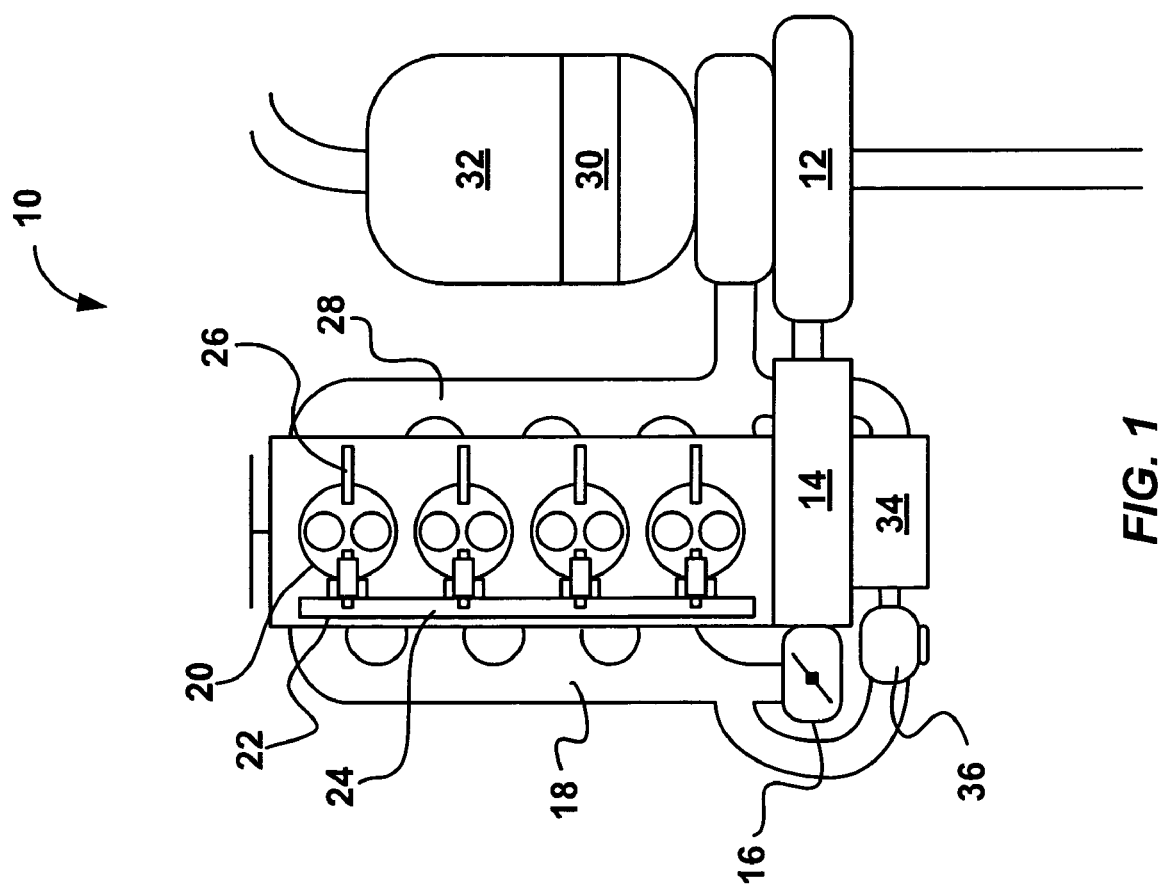
FIG. 1 is a schematic drawing of a diesel engine.

An example of a diesel engine contemplated herein is illustrated in FIG. 1. Air may enter the diesel engine 10 and may be pressurized in a turbocharger 12. It may be appreciated, however that when starting an engine, the turbocharger may be relatively ineffective and that the air may be naturally aspirated due to the downward motion of the pistons within the cylinders. The air may then pass through an intercooler 14 and through the intake throttle valve 16, which may be utilized to adjust the amount of air that enters the engine 10. The induced air may then pass through the intake manifold 18, which may deliver air to the individual cylinders 20. Fuel may also be introduced to the individual cylinders via a fuel injector 22 positioned within each cylinder, which may be fed by a common rail 24, as illustrated. A glow plug 26 may also be positioned within the cylinders 20 or cylinder heads.

Once combusted, the exhaust may exit through the exhaust manifold 28 and either exit the engine 10 through an oxygen catalyst 30 or may be recirculated through the system. If the exhaust exits through the system, the oxygen catalyst 30 may aid in reducing white smoke, HC, CO and other undesirable by-products of combustion. In addition, the exhaust may pass through a diesel particulate filter 32 prior to exiting the system. It may be appreciated that the oxygen catalyst 30 may be activated with intake throttling. Should the exhaust be recirculated, the exhaust may pass through another oxygen catalyst 34. An exhaust gas recirculation valve 36 may control the amount of exhaust gas delivered into the intake manifold and therefore to the engine 10. It may be appreciated that other diesel engine configurations are contemplated herein as well.

Figure 2B:
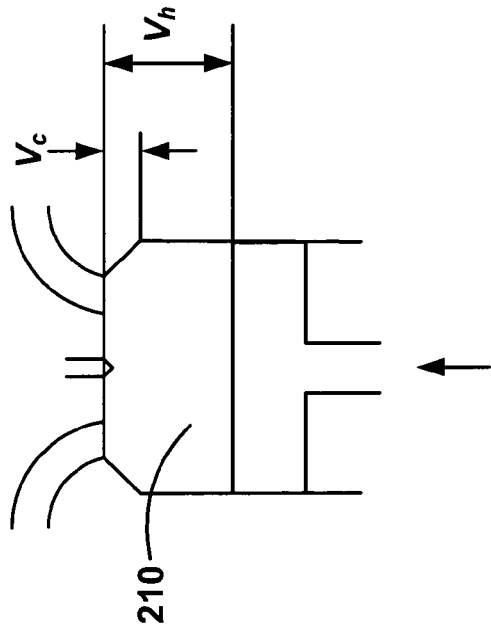
FIGS. 2a, b, c, and d are diagrams of an example of a four stroke combustion cycle.
Figure 2D:
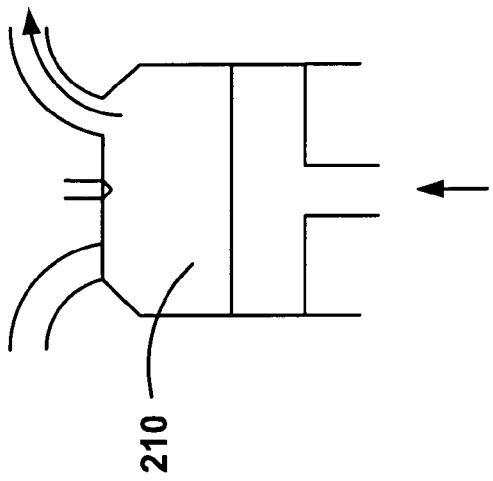
Figure 2A:
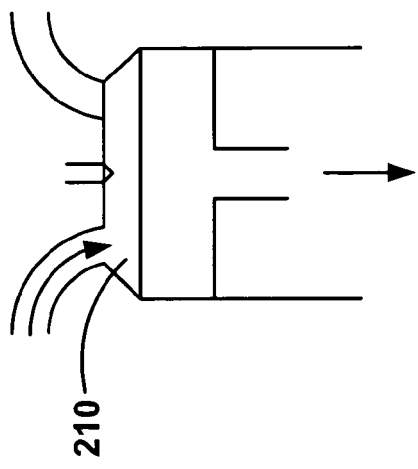

Many diesel engines may combust fuel and provide power during two or four stroke cycles. An example of a four stroke cycle is illustrated in FIGS. 2a, b, c, and d. During the first stroke (FIG. 2a), a piston may retract within its cylinder and air may be introduced into the combustion chamber 210 from the intake manifold (illustrated as 18 in FIG. 1). The combustion chamber may be understood as the location where combustion occurs in the engine. It may be appreciated that in some embodiments, the combustion chamber may generally be defined by the piston bowl, the cylinder in which the piston rides and the cylinder head. Therefore, the combustion chamber volume may vary throughout the cycle as the piston extends and retracts in the cylinder.

The air in the combustion chamber may then be compressed (FIG. 2b), wherein the piston may extend towards the cylinder head. The amount the air is compressed may be defined by the compression ratio. The compression ratio may be understood herein by the following equation:

$$\varepsilon = \frac{V_h + V_c}{V_c}$$

wherein $V_h$ is the volume of the combustion chamber encompassed by piston travel and $V_c$ is the volume of the combustion chamber with the piston at top dead center, i.e., fully extended. The compression ratio may be less than 16:1, such as between 12:1 to 16:1, including all values and increments therein. The compression may cause the air to reach a pressure in the range of 3 to 15 MPa, including all values and increments therein, and a temperature sufficient to cause auto-ignition of the fuel, such as in the range of 700° C. to 900° C.

Shortly before the end of the compression stroke, fuel may be injected into the combustion chamber 210. The fuel may be injected at a high pressure, including pressures of up to 200 MPa. The fuel may atomize and form a heterogeneous mixture with the air. That is, the ratio of air to fuel within combustion chamber may vary from pure air, near the periphery of the fuel spray, to pure fuel, near the center of the fuel spray. The design of the piston and/or combustion chamber and the motion of the piston within the combustion chamber may provide for turbulence, otherwise known as squish in the fuel flow, forming a flammable mixture of the fuel and air.

Figure 2C:
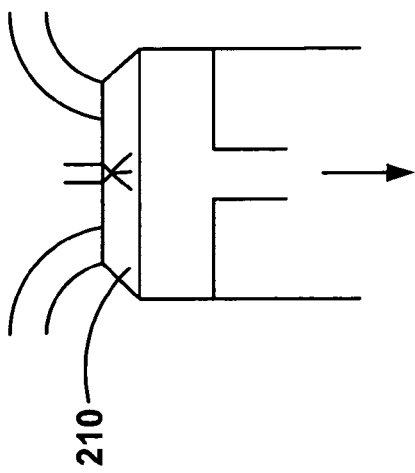

The flammable mixture may then auto-ignite due to the exposure to hot air generated by compression. Auto-ignition may begin prior to the piston becoming fully extended within the cylinder. As the piston achieves top dead center or fully extends within the cylinder, the resulting expansion of burning gasses pushes the piston back down again (FIG. 2c). Then the exhaust gasses may be exhausted from the combustion chamber 210 by the extension of the piston towards the cylinder head (FIG. 2d).

Ignitability of the fuel during the combustion cycle may be influenced by a number of factors, including the compression ratio defined above, intake air and cylinder block temperatures, air to fuel ratio, as well as a number of fuel characteristics.

The overall air to fuel ratio may be understood as the ratio of the air mass in the cylinder to the fuel mass in the cylinder. However, the local air to fuel ratio varies throughout the cylinder in a diesel engine due to the direct in-cylinder fuel injection. Ideal theoretical combustion may occur at the stoichiometric air fuel ratio, usually around 14.6:1. It may also be appreciated however, that combustion may occur at local air to fuel ratios above and below stoichiometric as well, although combustion may not be complete or may result in relatively low energy output. It is contemplated herein that the local air to fuel ratio may be in the range of approximately 5 to 35, including all values and increments therein.

It may also be appreciated that one may express the relationship of the air to fuel ratio with respect to the stoichiometric air to fuel ratio as the equivalence ratio. The local equivalence ratio may be represented by the following equation:

$$\phi_{local} = \frac{A{:}F_{stoichiometric}}{A{:}F_{local}}$$

wherein $\phi_{local}$ is the local equivalence ratio, $A{:}F_{stoichiometric}$ is the stoichiometric air to fuel ratio of 14.6:1 and $A{:}F_{local}$ is the local air to fuel ratio. The local equivalence ratio may be in the range of 0.4 to 3.0, including all values and increments therein.

Fuel characteristics may include the cetane number, distillation temperature and density. The cetane number may be understood herein as an indication of ignition quality or ignition delay during compression ignition. A cetane number of 100 is assigned to n-hexadecane (cetane), which ignites relatively easy, while relatively slow burning alpha methyl naphthalene is given a cetane number of 0. Ignition performance may be compared for various mixtures of cetane and methyl naphthalene in a test engine and assigned a cetane number based on the amounts of cetane and methyl naphthalene resulting in similar ignition characteristics as the test fuel. As explained more fully below, the method for combustion of fuel during a cold start may accommodate fuels having varying cetane numbers. For example, cetane numbers may be in the range of 40 to 55, including all values and increments therein.

Figure 3:
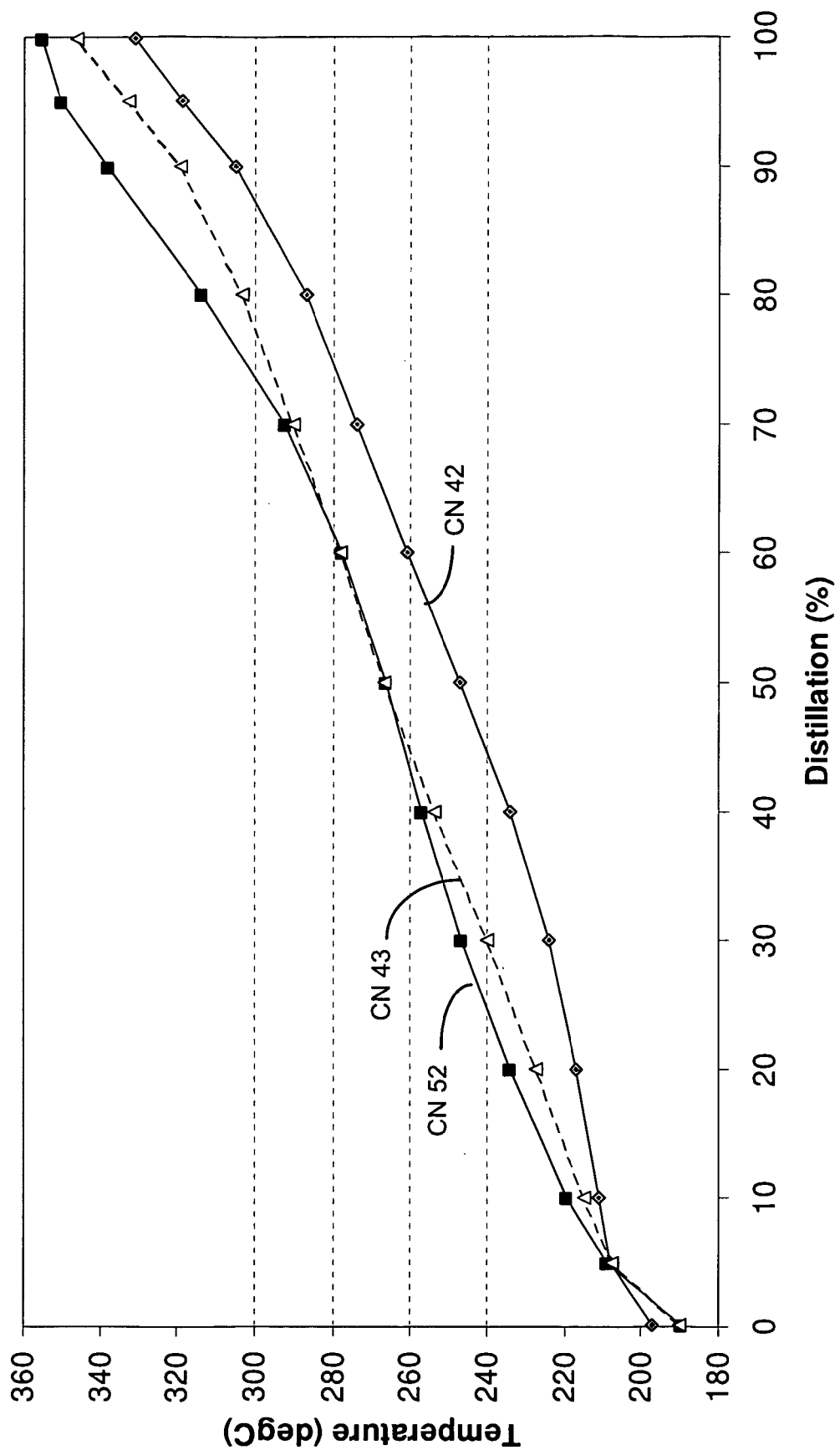
FIG. 3 is a plot of temperature versus percent distillation.

In addition, distillation temperature may influence the ignitability of the fuel. Distillation temperature may be understood as the temperature at which a given portion of a fuel vaporizes. The 90% fuel distillation temperature as measured by ASTM D86-07A, entitled "Standard Test Method For Distillation of Petroleum Products at Atmospheric Pressure" may be in the range of 275° C. to 375° C., including all values and increments therein. An example of fuel distillation temperatures for fuel samples having a cetane number (CN) of 42, 43 and 52, performed under ATSM D86-07A are provided in the plot of FIG. 3. The x-axis of the plot illustrates the percentage of a given sample of fuel that has evaporated and the y-axis illustrates the temperature at which a given percentage has distilled. As can be seen in the figure, 90% of the 52 cetane fuel has evaporated at approximately 340° C., whereas 90% of the 43 cetane fuel evaporated at approximately 320° C. and 90% of the 42 cetane fuel evaporated at approximately 305° C.

A further aspect of fuel which may be relative to ignitability is the density. Higher density fuels may lead to increased particulate emissions, whereas lower density fuels may lead to reduced engine output. As explained more fully below, the method for combustion of fuel during a cold start may accommodate fuels having varying densities. For example, fuel densities may be in the range of 0.82 to 0.88 g/ml.

During cold start, the cylinder block may absorb heat generated during the combustion process. Compression of the cold air may lead to lower compression pressure and compression temperature. The combination of these and other factors may result in a failure of the fuel to ignite. To remedy this problem, there is a need to increase the overall temperature of the cylinder block, including the combustion chamber, as some fuels may still fail to ignite due to variations in physical properties, such as cetane number, distillation characteristics and density.

The present disclosure relates to a system and method of utilizing a glow plug to ignite a portion of the fuel during cold start through what may be understood as surface ignition. Surface ignition is the ignition of fuel by contact or exposure to heat provided by a hot surface, i.e., a glow plug, in the cylinder. The glow plug may be a relatively high temperature glow plug, which may provide heating on the surface of the plug and within a localized region proximal to the plug at temperatures at or above the ignition temperature of the fuel. Utilizing the glow plug to ignite a portion of the fuel may provide for less reliance upon the compression of air in the cylinder, air temperature and cetane number of the fuel, and be particularly advantageous during cold start. As discussed more fully below, the glow plug may be configured to provide a localized high temperature region, not only on the surface of the glow plug, but in a particular region of air surrounding the glow plug.

The glow plug may be first activated prior to starting the engine and introducing air into the combustion chamber. Such initial activation may be for 10 seconds or less, including all values and increments in the range of 0.1 to 10 seconds. The glow plug may remain on for a selected time period that may exceed the time periods generally used the conventional starting phase of a diesel engine (2 seconds to reach a temperature of about 850° C. and up to 3 minutes in the post start phase once the engine has started). Accordingly, the glow plugs may remain on for a period of greater than 3 minutes and two seconds up to 7.5 minutes, including all values and increments therein, and then deactivated for engine operation. For example, the glow plugs herein may now be energized for 2 seconds prior to engine start, then remain on for a period of 3 minutes, and also remain on to reach a total time of up to about 6.5 minutes. In addition, the glow plug may remain activated until a temperature sensor located within the engine or the engine coolant temperature reaches a given point.

Figure 4:
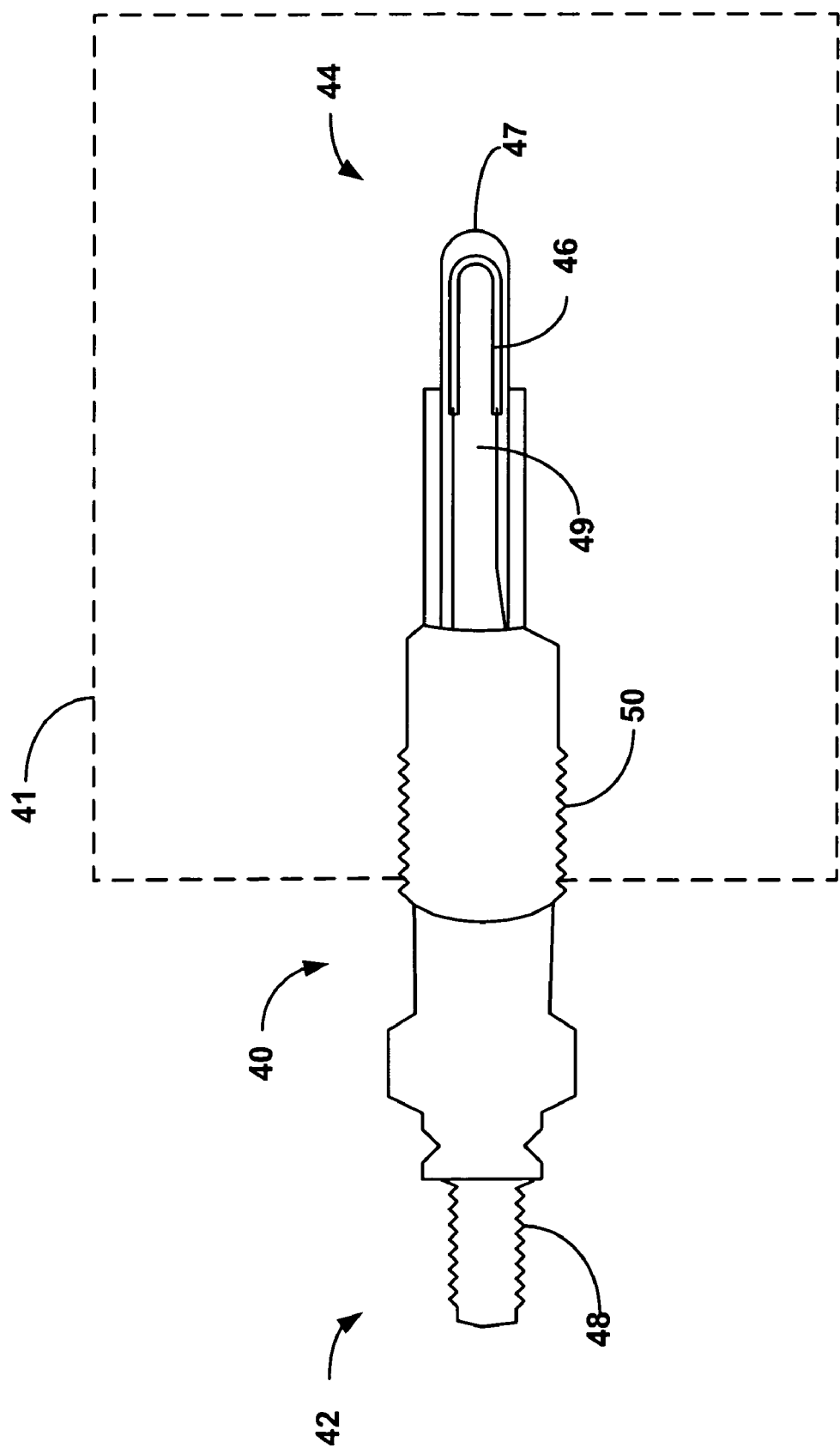
FIG. 4 is a schematic of an exemplary glow plug.

As illustrated in FIG. 4, a glow plug 40 may include a proximal portion 42 and a distal portion 44. The distal portion 44 of the glow plug may be positioned within the combustion chamber 41 and may include a heating element or coil 46 covered by a sheath 47. The heating element may have a sufficient melting point so as to withstand the temperatures associated with the combustion process. In addition, the heating element may be encased in a ceramic material 49 having a sufficient thermal conductivity to conduct heat to the surface of the element. Furthermore the glow plug may include a control coil (not illustrated) configured to regulate the voltage, reducing current intensity as the temperature increases. The glow plug may also include a connector 48 near the proximal end 42 to provide power to the heating element. Furthermore, the glow plug 40 may include a threaded portion 50 to attach the glow plug to the combustion chamber 41.

Figure 5:
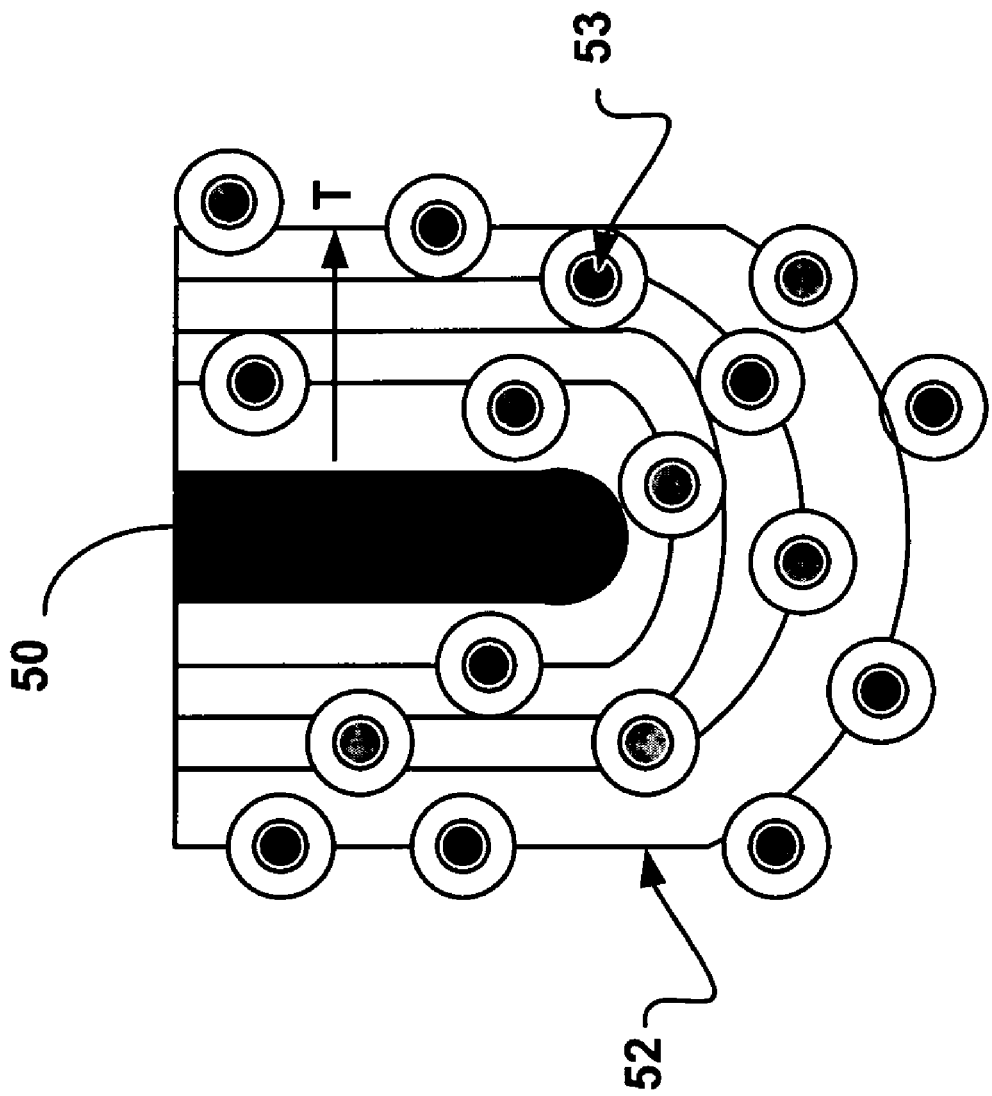
FIG. 5 is an illustration of an example of a temperature gradient in a localized region proximate to a glow plug.

The localized temperature created by the glow plug, including the plug surface and surrounding air may be greater than or equal to 1,000° C., including all values and increments in the range of 1,000° C. to 2,000° C., such as about 1,200° C. or more. Accordingly, the glow plug may have a localized heated region providing a temperature $T_1$ within the heated region that, depending upon the equivalence ratio of the fuel developed in the region, may be capable of providing auto-ignition. FIG. 5 provides a schematic drawing illustrating the heating effects of a glow plug 50 in a localized region 52 proximal to the plug. Fuel droplets are indicated at 53. In the illustrated example, the temperature at the surface of the glow plug may be about 1300° C. and may drop (approximately along arrow T) within the localized region from about 1200° C. to 600° C. The localized and heated region may be in the range of 0.1 to 5 mm from the glow plug surface, including all values and increments therein. It may be appreciated that the temperature gradient within the localized region may be affected by factors such as temperature of the environment surrounding the engine, the temperature of the combustion chamber at any given time, in-cylinder air motion, the thermal mass of the combustion chamber, including the cylinder block and pistons, etc.

Figure 6:
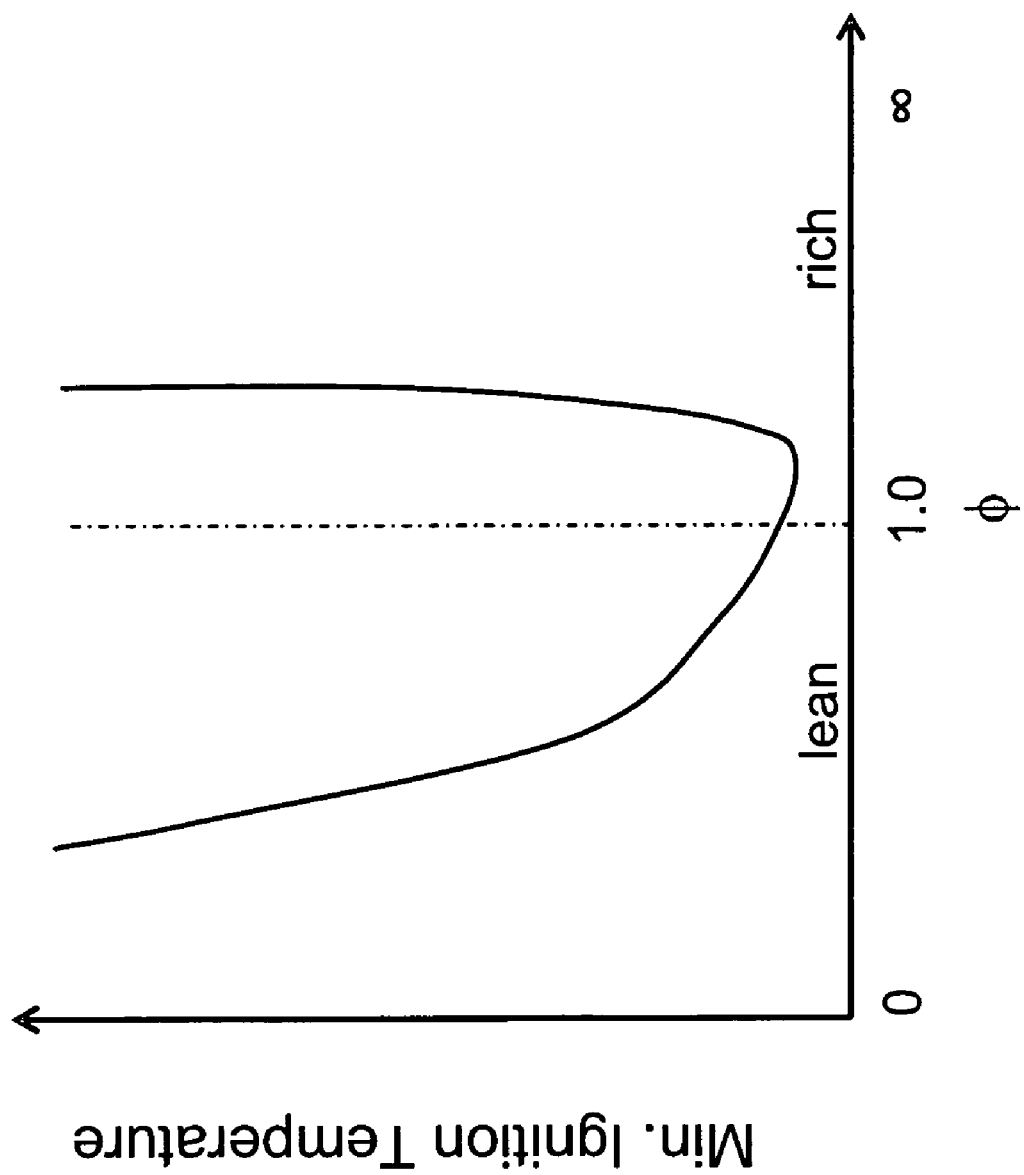
FIG. 6 is a plot of the ignitability of a given fuel relative to the equivalence ratio.

FIG. 6 illustrates the ignitability of fuel in terms of a minimum auto-ignition temperature relative to the equivalence ratio, wherein the equivalence ratio increases from 0 or pure air (where phi meets the x-axis) to all fuel or infinity (∞). As alluded to above, the equivalence ratio of the fuel may change as more or less air is added to the air to fuel mixture. By directing either air or fuel to a given area in the cylinder, the air to fuel ratio and/or equivalence ratio may be altered in that region.

Figure 7:
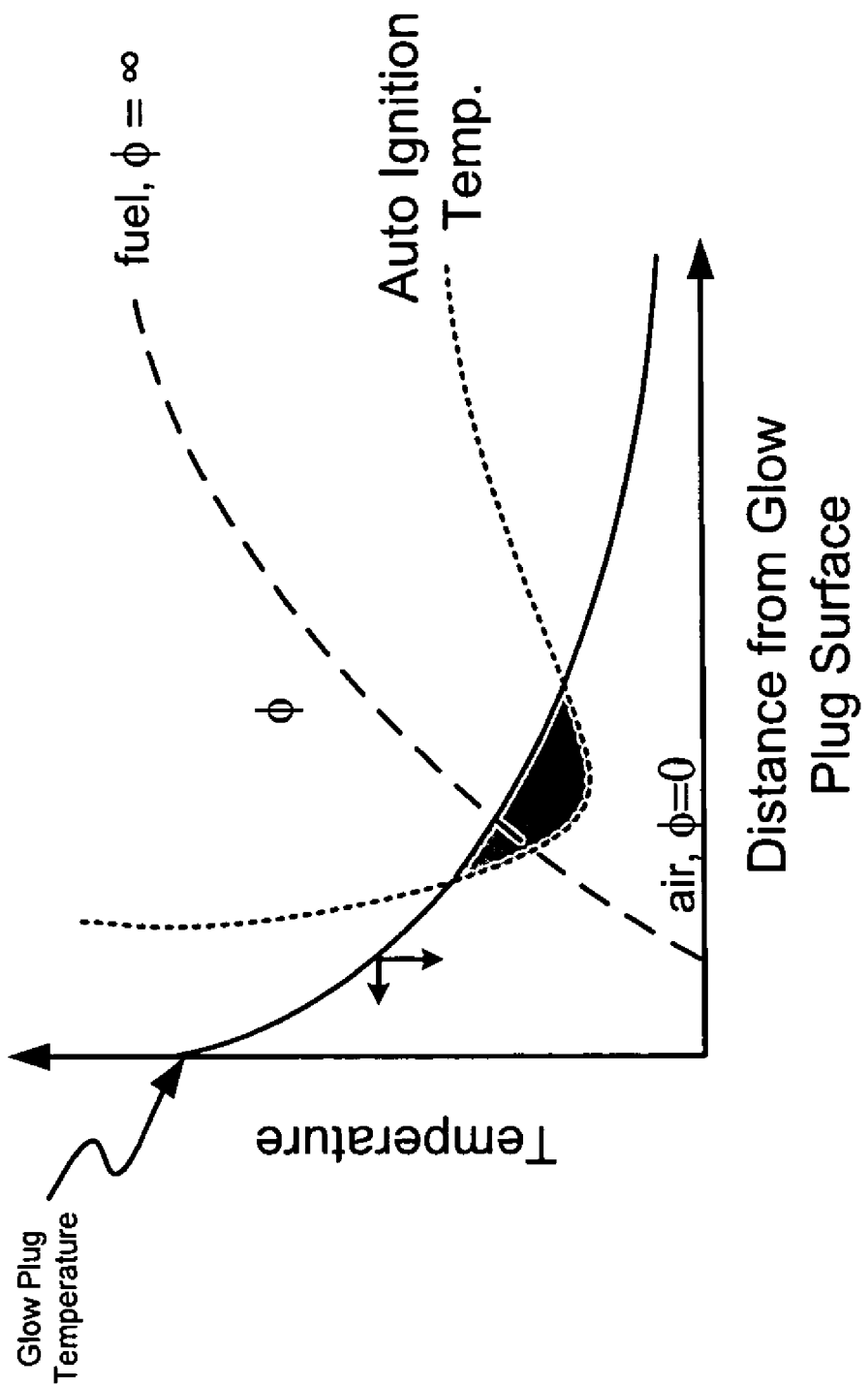
FIG. 7 is another plot of the ignitability of a given fuel relative to the equivalence ratio and the distance from the glow plug.

FIG. 7 illustrates the ignitability of fuel in terms of its location relative to the glow plug surface within the cylinder. In addition, FIG. 7 superimposes the relationship between the equivalence ratio and auto ignition temperature. As may be appreciated the fuel may ignite (illustrated by the shaded area) where the temperature of the glow plug surface or localized region is at or greater than the auto-ignition temperature of a given equivalence ratio.

The glow plug may be positioned within the combustion chamber and/or the combustion chamber may be designed such that the fuel may be directed towards the glow plug either by, for example, the fuel spray or by air motion (squish or swirl) within the combustion chamber. Accordingly, the fuel may be directly directed towards the glow plug during injection (direct fuel spray) and/or indirectly directed towards the glow plug via impingement of the fuel against one or more surfaces of the chamber to deflect the fuel towards the glow plug. The indirect method of fuel delivery via impingement provides the added benefit of increasing the time available for fuel vaporization, by, e.g., at least double that over the direct method for fuel vaporization and mixing with air. Accordingly, for a given combustion chamber, directing an amount of a mass of fuel towards a localized heated region by direct fuel spray will provide a first time $t_1$ for fuel vaporization and mixing, and the method of impinging said fuel against one or more chamber surfaces can now provide a second time $t_2$ for fuel vaporization and mixing, where $t_2$ is at least twice $t_1$. In addition, it is contemplated that such indirect fuel introduction by impingement against a surface of the chamber may be configured such that $t_2$ may have a value that is up to about five times the value of $t_1$.

Figure 8A:
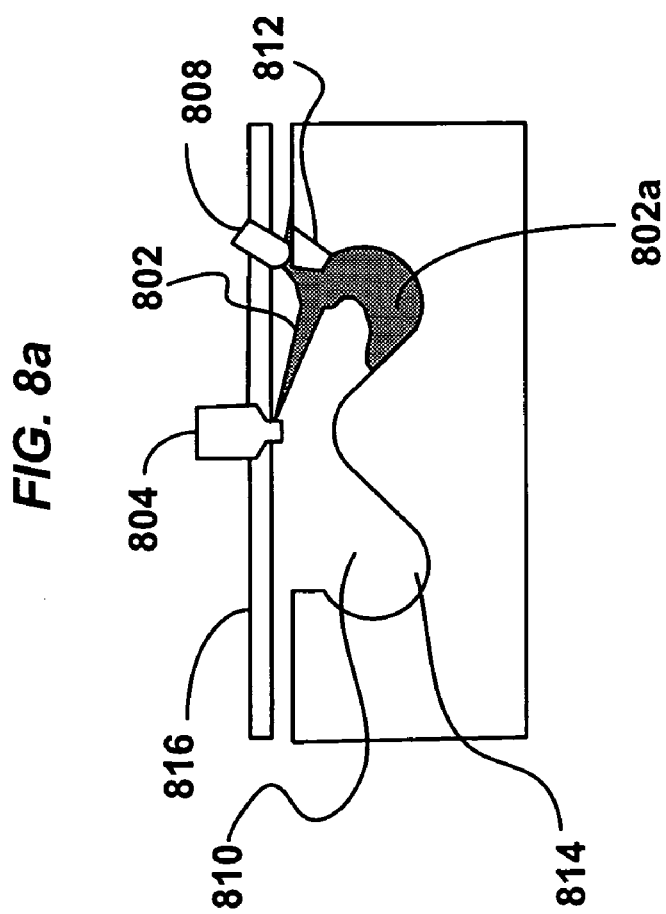
FIGS. 8a, 8b, 8c and 8d illustrate a single stage combustion chamber. In particular.
Figure 8B:
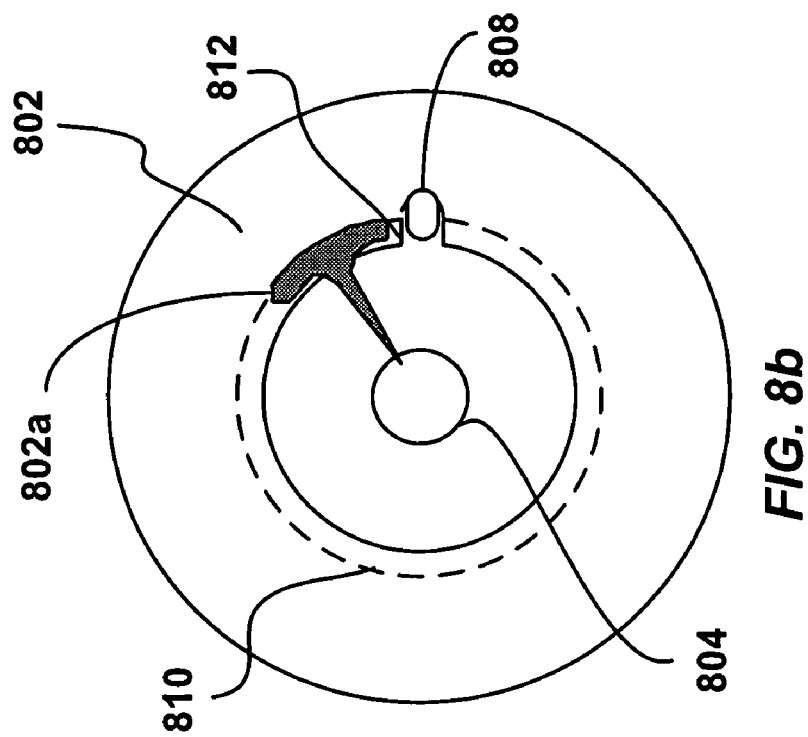
Figure 8D:
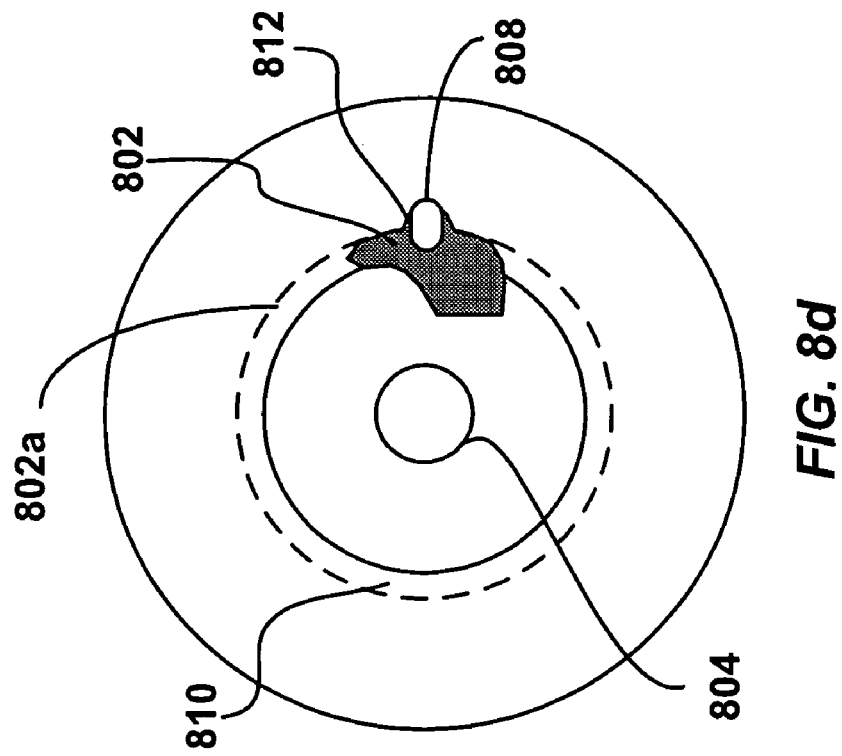
Figure 8C:
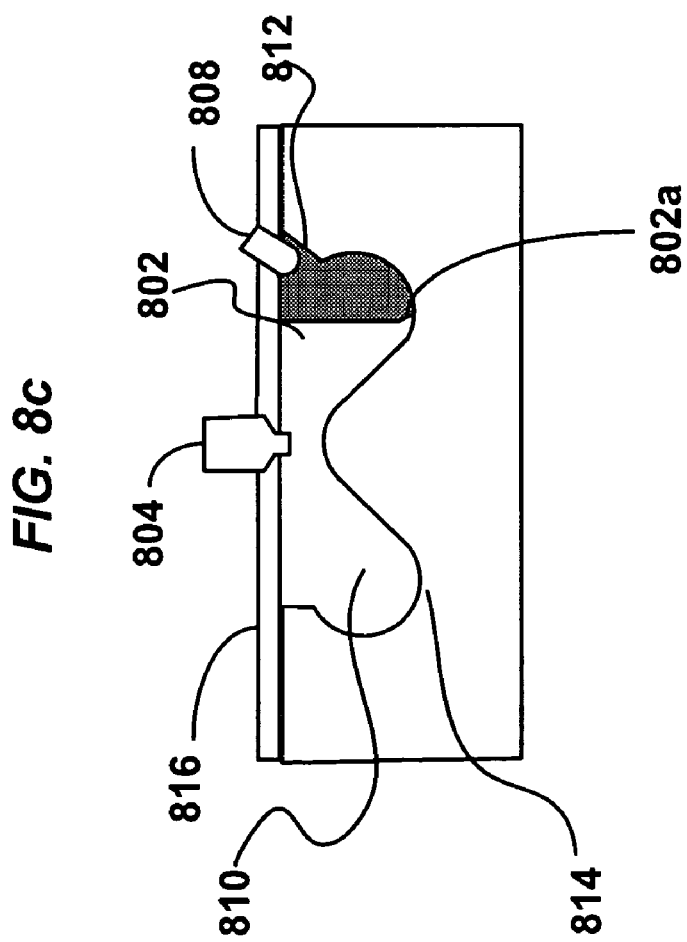

For example, in a single stage combustion chamber, the fuel may be injected directly into the combustion chamber. FIGS. 8a and 8b illustrate fuel 802 being injected by an injection port 804 into a combustion chamber 810, which as illustrated, includes the piston bowl 814 and cylinder head 816. The combustion chamber may also include a glow plug 808, which may be positioned within a glow plug pocket 812. Fuel vapor is shown at 802a. The air intake port may induce swirl in the combustion chamber providing motion of fuel and air to facilitate mixing. In addition, the design of the combustion chamber itself may affect the flow of fuel and air within the combustion chamber. As illustrated in FIGS. 8c and 8d, swirl and/or chamber design may cause a flammable mixture of the fuel and air to enter the glow plug pocket 812 and stagnate there long enough for the fuel to ignite.

Figure 9B:
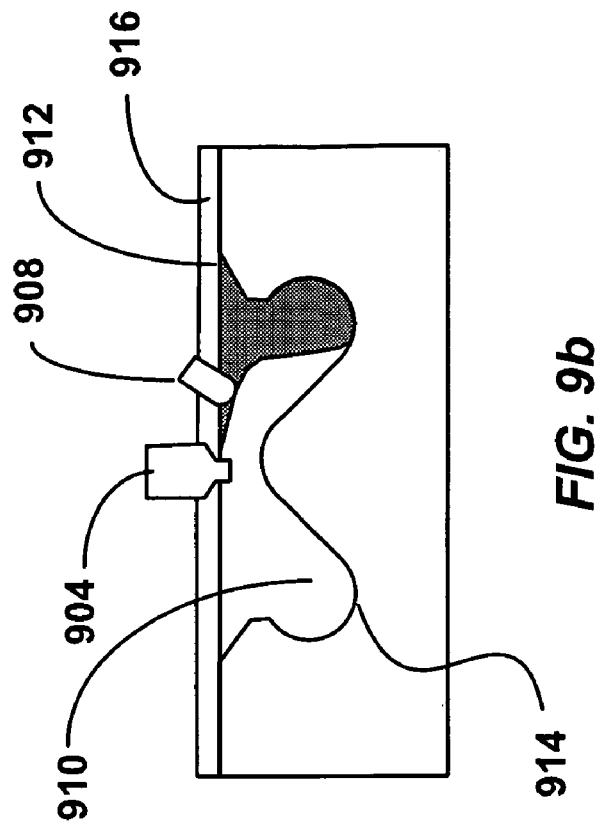
FIGS. 9a and 9b illustrate a side view of a two stage combustion chamber. In particular.
Figure 9A:
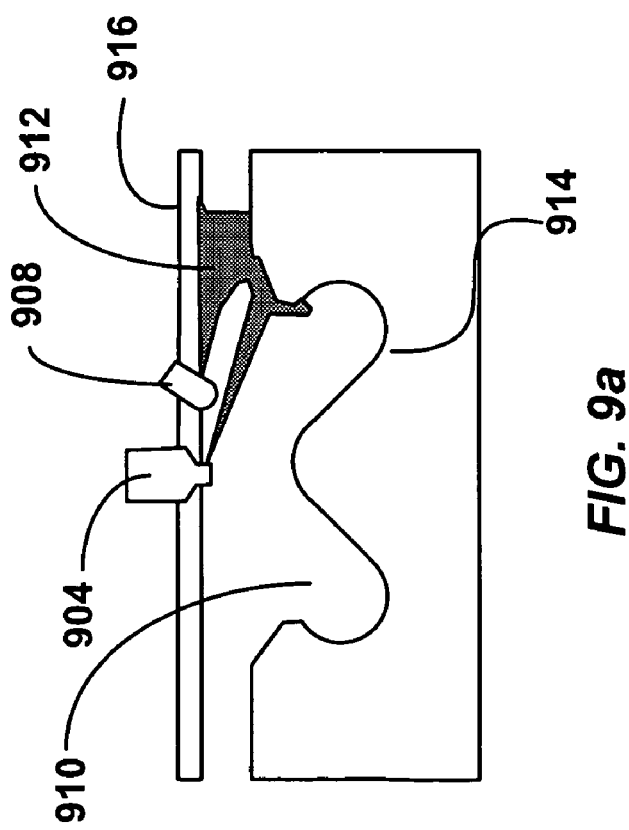

In a combustion chamber including an upper stage in the combustion bowl, illustrated in FIGS. 9a and 9b, a portion of the fuel may be injected by an injection port 904 into the upper stage 912 of the combustion chamber 910. The combustion chamber includes piston bowl 914 and an upper stage location 912 defined within the bowl and a cylinder head 916. An upper stage may therefore be understood as a volume of the combustion chamber defined by an upper portion of the piston bowl. As illustrated, the upper stage 912 may be circumferentially disposed about the piston bowl opening.

The fuel may impinge either directly or indirectly against the combustion chamber wall, wherein a significant amount of the fuel may impinge against the upper stage of the combustion chamber wall, and the fuel droplet size may be decreased. The fuel may then be directed towards the glow plug due to squish, i.e., air motion created by the upward movement of the piston in the cylinder, which may impart mixing of the fuel with air. Squish may again be affected by combustion chamber design. A flammable mixture may form and through this process the mixture may stagnate near the glow plug 908.

As alluded to above, the fuel may be injected into the combustion chamber relatively early in the combustion cycle, under high pressure, and/or in multiple stages to facilitate surface ignition. For example, early injection may occur in the range of 0.4 ms to 1 ms, including all values and increments therein prior to the piston reaching top dead center (or fully extending within the cylinder.) Relatively high injection pressure, as alluded to above, may be in the range of 120 MPa to 200 MPa, including all values and increments therein. Furthermore, during multiple stage injection, the fuel may be delivered in portions. A first portion of fuel, in the range of 5% to 20% of the fuel mass may be injected in a first stage in the range of 0.4 to 1 ms, including all values and increments therein, prior to full extension of the piston in the cylinder. A second portion of fuel, in the range of 80% to 95% of the fuel mass may be injected in a second stage occurring in the range of 0.01 to less than 0.4 ms, including all values and increments therein, prior to full extension of the piston in the cylinder.

Fuel stagnation times, the time in which the fuel is exposed to the glow plug prior to surface ignition, may vary depending on individual fuel characteristics and temperatures within the cylinder. For example, stagnation times may be in the range of 0.1 to 2 ms, including all values and increments therein. Once a portion of the fuel has reached ignition temperature, the portion of the fuel ignite creating burning gasses. The burning gasses may expand, increasing the pressure and temperature of the air in the combustion chamber. The resulting increase in pressure and temperature of the air in the combustion chamber may then result in the auto-ignition of the remainder of the fuel injected into the combustion chamber. However, regardless of the mechanism, the remainder of the fuel injected into the cylinder may ignite and the combustion cycle may progress.

In addition to the above, ignition of the fuel may be facilitated by reducing the overall air fuel ratio with intake throttling. Throttling the intake and reducing the air to fuel ratio may produce richer fuel air mixtures, resulting in an increase in combustion gas temperatures and accelerated flame propagation speed. For example, a 10 to 40% reduction in the air intake mass, including all values and increments therein, may be provided.

While the above method and system may increase the ignitability of the fuel, combustion may be incomplete, i.e., when the flame propagation is not completed or some part of the fuel is not ignited in the portion far away from the glow plug, leaving some undesirable byproducts in the exhaust, including hydrocarbons, carbon monoxide, and/or unburned fuel. Accordingly, an oxygen catalyst may be included in the system to reduce the byproducts into carbon dioxide and water. Referring to FIG. 1, the oxygen catalyst 30 may operate, for example, when intake throttle 16 is activated and throttling occurs. In addition, it is also contemplated that the oxygen catalyst may operate for the extent of time that the glow-plug is activated.

In addition, a system to start a diesel engine may be provided wherein the system may be capable of starting the glow plug based upon temperature. An example of such system, illustrated in FIG. 10 may include an engine control unit 100 and a temperature sensor 102 in communication with the control unit 100 and configured to detect one of: (i) a temperature of an environment surrounding the engine; or (ii) a temperature of engine coolant. In addition, the system may include an engine 104, such as that illustrated in FIG. 1. The engine control unit 100 may be configured to activate the glow plug 106 based upon the temperature detected by the temperature sensor 102.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of combusting fuel, comprising:
providing a glow-plug within a combustion chamber having a volume including a piston bowl; wherein said glow plug provides a localized heated region;
providing air into said combustion chamber;
compressing said air;
providing a mass of fuel into said combustion chamber;
directing in an indirect manner an amount of said mass of fuel by impingement of the fuel against one or more surfaces of said piston bowl to deflect the fuel towards a localized heated region of the glow plug, said glow plug region having a temperature $T_1$, wherein the equivalence ratio of said fuel in said heated region achieves a value such that $T_1$ provides auto-ignition, and igniting all or a portion of said mass of fuel directed towards said heated region of said glow plug; and
igniting the remainder of said fuel at an auto-ignition temperature, wherein, for said combustion chamber, directing an amount of said mass of fuel towards a localized heated region by a direct fuel spray to said localized heated region of said glow plug provides a first time $t_1$ for fuel vaporization and mixing, and said impingement of said fuel against one or more piston bowl surfaces provides a second time $t_2$ for fuel vaporization and mixing, where $t_2$ is at least twice $t_1$.

2. The method of claim 1, wherein $t_2$ is up to five times the value of $t_1$.

3. The method of claim 1 wherein said glow plug has a surface and said localized heated region of said glow plug in the range of 0.1 to 5 mm from the glow plug surface.

4. The method of claim 1 wherein said glow plug temperature is greater than 1,000° C.

5. The method of claim 1, wherein said glow plug is activated for 10 seconds or less prior to providing said air into said combustion chamber.

6. The method of claim 1, wherein said glow plug is activated for up to 7.5 minutes and then deactivated.

7. The method of claim 1, wherein said amount of fuel is ignited by surface ignition.

8. The method of claim 1, wherein said ignited portion of fuel increases the temperature in said combustion chamber to said auto-ignition temperature of the remainder of said fuel.

9. The method of claim 1, wherein said air is compressed at a compression ratio of 12:1 to 16:1.

10. The method of claim 1, wherein said air and fuel are provided at an overall air to fuel ratio in the range of 5 to 35.

11. The method of claim 1, wherein said combustion chamber is a single stage combustion chamber including a glow-plug pocket surrounding said glow plug.

12. The method of claim 1, wherein said combustion chamber is a two stage combustion chamber including an upper stage proximate to said glow plug.

13. The method of claim 1, further comprising throttling said air to provide a reduction in air mass in the range of 10% to 40%.

14. The method of claim 1, furthermore comprising generating exhaust and passing said exhaust through an oxidation catalyst.

15. The method of claim 14, wherein said oxidation catalyst is activated upon activation of said throttling.

16. The method of claim 1 further comprising detecting one of (i) a temperature of an environment surrounding said engine; or (ii) a temperature of engine coolant, and activating said glow plug to provide said localized heated region based upon said detected temperature.

17. The method of claim 1, wherein said fuel is provided in at least two stages.

18. An engine, comprising:
a combustion chamber having a volume and including a piston bowl and a cylinder;
an air intake port configured to direct air into said combustion chamber;
a fuel injector configured to inject a mass of fuel into said combustion chamber; and
a glow plug including a resistive heating element provided in said combustion chamber, configured to provide a localized region of heating, wherein said air intake port and/or said piston bowl are configured to indirectly direct an amount of said mass of fuel by impingement of the fuel against one or more surfaces of said bowl to deflect the fuel towards said localized region, wherein said localized region of heating is configured to ignite a portion of said fuel and wherein, for said combustion chamber, directing an amount of said mass of fuel towards a localized heated region by a direct fuel spray to said localized heated region of said glow plug provides a first time $t_1$ for fuel vaporization and mixing, and said impingement of said fuel against one or more piston bowl surfaces provides a second time $t_2$ for fuel vaporization and mixing, where $t_2$ is at least twice $t_1$.

19. The engine of claim 18, wherein said combustion chamber is a single stage chamber including a wall and glow plug pocket defined in said combustion chamber wall and a portion of said glow plug is positioned within said glow plug pocket.

20. The engine of claim 18, wherein said combustion chamber is a two stage chamber, including an upper stage wherein a portion said glow plug is positioned proximate to said upper stage.

21. The engine of claim 18, further comprising an intake throttle and an oxidation catalyst, configured to be activated upon activation of said intake throttle.

22. A system for cold-start of a diesel engine comprising:
an engine control unit;
a temperature sensor in communication with said control unit and configured to detect one of:
(i) a temperature of an environment surrounding said engine; or
(ii) a temperature of engine coolant;
a combustion chamber having a volume and including a piston bowl and a cylinder;
an air intake port configured to direct air into said combustion chamber;
a fuel injector configured to inject a mass of fuel into said combustion chamber; and
a glow plug including a resistive heating element provided in said combustion chamber, configured to provide a localized region of heating, wherein said air intake port and/or said piston are configured to indirectly direct an amount of said mass of fuel by impingement of the fuel against one or more surfaces of said piston bowl to deflect the fuel towards said localized region wherein said localized region of heating is configured to ignite a portion of said fuel;
wherein said engine control unit is configured to activate said glow plug based upon said detected temperature and wherein, for said combustion chamber, directing an amount of said mass of fuel towards a localized heated region by a direct fuel spray to said localized heated region of said glow plug provides a first time $t_1$ for fuel vaporization and mixing, and said impingement of said fuel against one or more piston bowl surfaces provides a second time $t_2$ for fuel vaporization and mixing, where $t_2$ is at least twice $t_1$.

23. The system of claim 22 where said temperature of said environment is 10° C. or less or said engine coolant temperature is less than 60° C.

* * * * *